(12) United States Patent  
Khatri et al.

(10) Patent No.: US 12,476,955 B2
(45) Date of Patent: Nov. 18, 2025

(54) SECURITY KEY INTEGRITY VERIFICATION USING INVENTORY CERTIFICATES

(71) Applicant: Dell Products L.P., Round Rock, TX (US)

(72) Inventors: Mukund P. Khatri, Austin, TX (US); Senthilkumar Ponnuswamy, San Jose, CA (US); Marshal F. Savage, Austin, TX (US); Eugene David Cho, Austin, TX (US)

(73) Assignee: Dell Products L.P., Round Rock, TX (US)

(*) Notice: Subject to any disclaimer, the term of this patent is extended or adjusted under 35 U.S.C. 154(b) by 69 days.

(21) Appl. No.: 17/973,784

(22) Filed: Oct. 26, 2022

(65) Prior Publication Data

US 2024/0146714 A1 May 2, 2024

(51) Int. Cl.
*H04L 9/40* (2022.01)
(52) U.S. Cl.
CPC ........ *H04L 63/0823* (2013.01); *H04L 63/061* (2013.01)
(58) Field of Classification Search
CPC ............... H04L 63/0823; H04L 63/061; H04L 2463/082
See application file for complete search history.

(56) References Cited

U.S. PATENT DOCUMENTS

| | | | |
|---|---|---|---|
| 2019/0042707 A1* | 2/2019 | Young | G06F 21/604 |
| 2022/0207125 A1* | 6/2022 | Young | H04L 9/0897 |
| 2022/0207126 A1* | 6/2022 | Young | H04L 9/3268 |
| 2022/0207474 A1* | 6/2022 | Young | G06Q 10/0833 |
| 2023/0342446 A1* | 10/2023 | Reddy | G06F 21/602 |

OTHER PUBLICATIONS

Rameez Loladia, "Just-in-Time Registration of Device Certificates on AWS IoT", found at https://aws.amazon.com/blogs/iot/just-in-time-registration-of-device-certificates-on-aws-iot/, Aug. 16 (Year: 2016).*

"Dell Technologies Secured Component Verification for PowerEdge" Dell Technologies Solution Brief; 2020; downloaded on Oct. 18, 2022.

"TCG Platform Certificate Profile"; Specification Version 1.1, Revision 15, Feb. 13, 2019; downloaded on Oct. 18, 2022.

(Continued)

*Primary Examiner* — Piotr Poltorak

(74) *Attorney, Agent, or Firm* — Ryan, Mason & Lewis, LLP

(57) ABSTRACT

Techniques are provided for security key integrity verification using inventory certificates. One method comprises receiving a user request to perform an action: obtaining an inventory certificate associated with a device; extracting a security key identifier from a security key corresponding to the device; validating the security key by comparing the extracted security key identifier to a security key identifier in the inventory certificate; and authorizing a performance of the action based on a result of the comparison. A validity of the inventory certificate may be evaluated (e.g., by evaluating a signature associated with the inventory certificate). The inventory certificate may be stored in a secure memory of the device prior to a delivery of the device to a purchaser of the device.

20 Claims, 8 Drawing Sheets

(56) References Cited

OTHER PUBLICATIONS

"TCG Platform Certificate Profile"; Specification Version 1.1, Revision 19, Apr. 10, 2020; downloaded on Oct. 18, 2022.
"Security Key Integration: Installing a Certificate on a YubiKey"; 2022 SecureW2; downloaded on Oct. 18, 2022.
"What Works in Certificate and Key Management; Enabling Secure Digital Business Using Venafi's Trust Protection Platform"; SANS What Works; downloaded on Oct. 18, 2022.

* cited by examiner

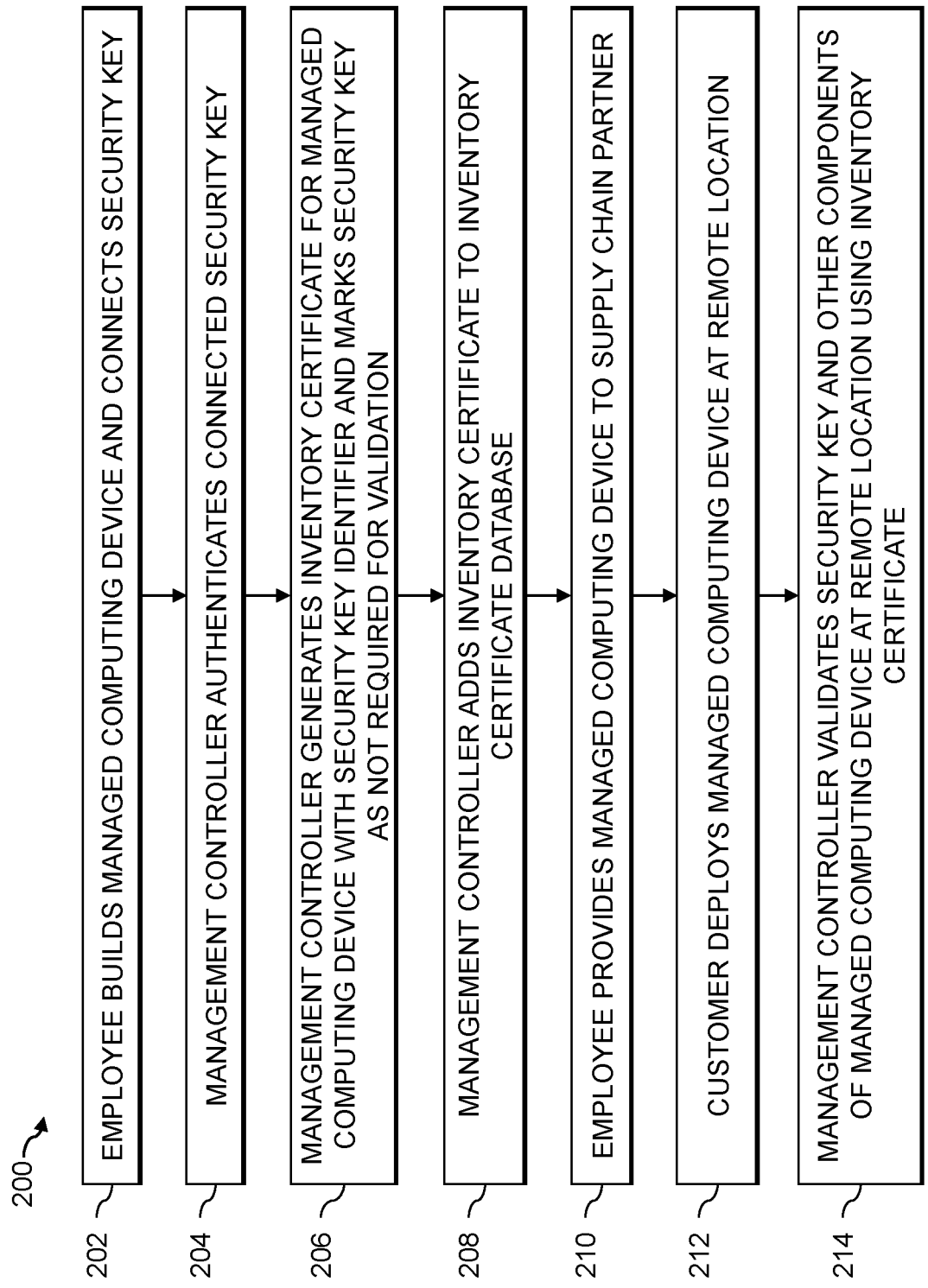

```
MANAGED COMPUTING
DEVICE INVENTORY CERTIFICATE 300

DEVICE IDENTIFIER:   MANAGED COMPUTING DEVICE SERIAL NUMBER

...

"OEM-ABC-ISSUED SECURITY KEY": {
    "METADATA: {
        "ComponentClassRegistryOID": "2.3.4.E.F.G",
        "ComponentClassValue": "0xXXXXXX"
    },
    "PROPERTIES": [
        {
            "CompareUID": false,
            "Name": "KEY SERIAL NUMBER"
        },
        ...
    ]
}
```

FIG. 3

SECURITY KEY INTEGRITY VERIFICATION USING INVENTORY CERTIFICATES

FIELD

The field relates generally to information processing systems, and more particularly to security in such information processing systems.

BACKGROUND

Computing devices are typically configured to incorporate security functionality to protect such devices from unauthorized and/or malicious activity. For example, it may be desirable to prevent suspicious computer operations, such as those implemented by an illegitimate and/or unauthorized user. Such security functionality, however, may be vulnerable to various types of attacks, such as password theft and/or session hijacking.

A need exists for improved techniques for protecting devices from suspicious and/or unauthorized computer operations.

SUMMARY

In one embodiment, a method comprises receiving a user request to perform at least one action related to at least one processing device comprising a processor coupled to a memory: obtaining an inventory certificate associated with the at least one processing device; extracting a security key identifier from a security key corresponding to the at least one processing device; validating the security key by comparing the extracted security key identifier to a security key identifier in the inventory certificate; and authorizing a performance of the at least one action based at least in part on a result of the comparison.

In some embodiments, a validity of the inventory certificate associated with the at least one processing device is evaluated (e.g., by evaluating a signature associated with the inventory certificate). The inventory certificate may be stored in a secure memory of the at least one processing device prior to a delivery of the at least one processing device to a purchaser of the at least one processing device.

In one or more embodiments, the security key is authenticated by determining whether the security key satisfies one or more security key validity criteria. A multi-factor authentication of the user may be performed utilizing the security key as a second authentication factor.

Other illustrative embodiments include, without limitation, apparatus, systems, methods and computer program products comprising processor-readable storage media.

BRIEF DESCRIPTION OF THE DRAWINGS

FIG. 2 is a flow chart illustrating an exemplary implementation of a process for provisioning security keys with a managed computing device being deployed in accordance with an illustrative embodiment;

FIG. 3 illustrates a managed computing device inventory certificate in accordance with an illustrative embodiment;

DETAILED DESCRIPTION

Figure 1A:
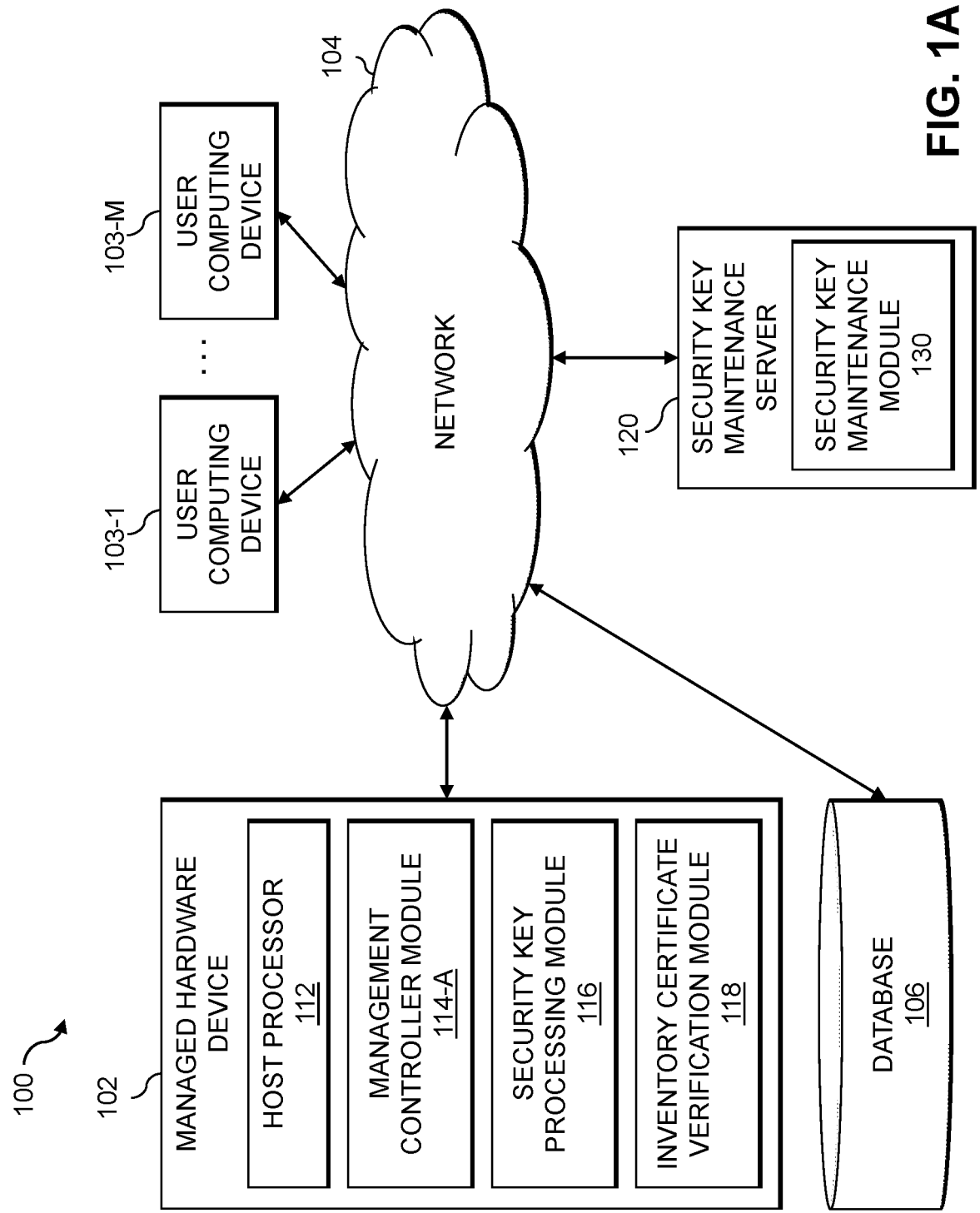
FIGS. 1A and 1B illustrate information processing systems configured to protect devices using security key integrity verification in accordance with illustrative embodiments.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for security key integrity verification using inventory certificates.

A security key, such as a pluggable security key (e.g., a Yubico Yubikey® and/or an RSA SecurID key) often facilitates access to other devices, online systems and/or applications (collectively referred to herein as restricted resources), for example, as part of a multi-factor authentication. The security key may be used in addition to, or instead of, a password, for example.

Many hardware device manufacturers employ an open model and allow users to provide and register their own security key with a given hardware device. Such an open model provides valuable flexibility to users, but also introduces additional security considerations (for example, when an employee unknowingly enrolls a malicious security key device). In addition, security key lifecycle management (e.g., addressing the reuse of a key or a lost key) may be burdensome for users to manage.

In one or more embodiments, the disclosed security key integrity verification techniques bind one or more specific security keys to a given hardware device during a provisioning of the hardware device using an inventory certificate associated with the hardware device, such as a Trusted Computing Group (TCG) platform certificate for unique-per hardware device attestation. The security key may be recorded in the inventory certificate, for example, with a unique identifier that can be compared to an identifier value extracted from a security key in connection with an attempt by a user to perform a privileged action using the hardware device (e.g., accessing a restricted resource). The inventory certificate may have a property associated with the security key that indicates that the security is not required to be installed as part of a validation of the hardware device. In this manner, the hardware device can be validated without the security key being installed. A TCG delta platform certificate may be employed in some embodiments to support authorized revocation and/or replacement of lost, stolen or damaged security keys.

In some embodiments, the disclosed security key integrity verification keys provide a validation of the security key itself in addition to the validation of the user provided by the authentication protocol (e.g., a secured component verification (SCV) and/or a universal second factor (U2F)/FIDO2 (Fast Identity Online 2)) normally performed in connection with a security key.

Among other benefits, the disclosed techniques for security key integrity verification using inventory certificates protect devices from unauthorized and/or malicious actions or commands, such as attempts to: (i) log in to a protected device or system; or (ii) perform a privileged action, such as an unauthorized encryption or deletion of one or more files or another critical function or to access a restricted or protected resource. In addition, the security key integrity verification techniques, in some embodiments, require proof of physical possession of a hardware device, as well as the associated security key.

Figure 1B:
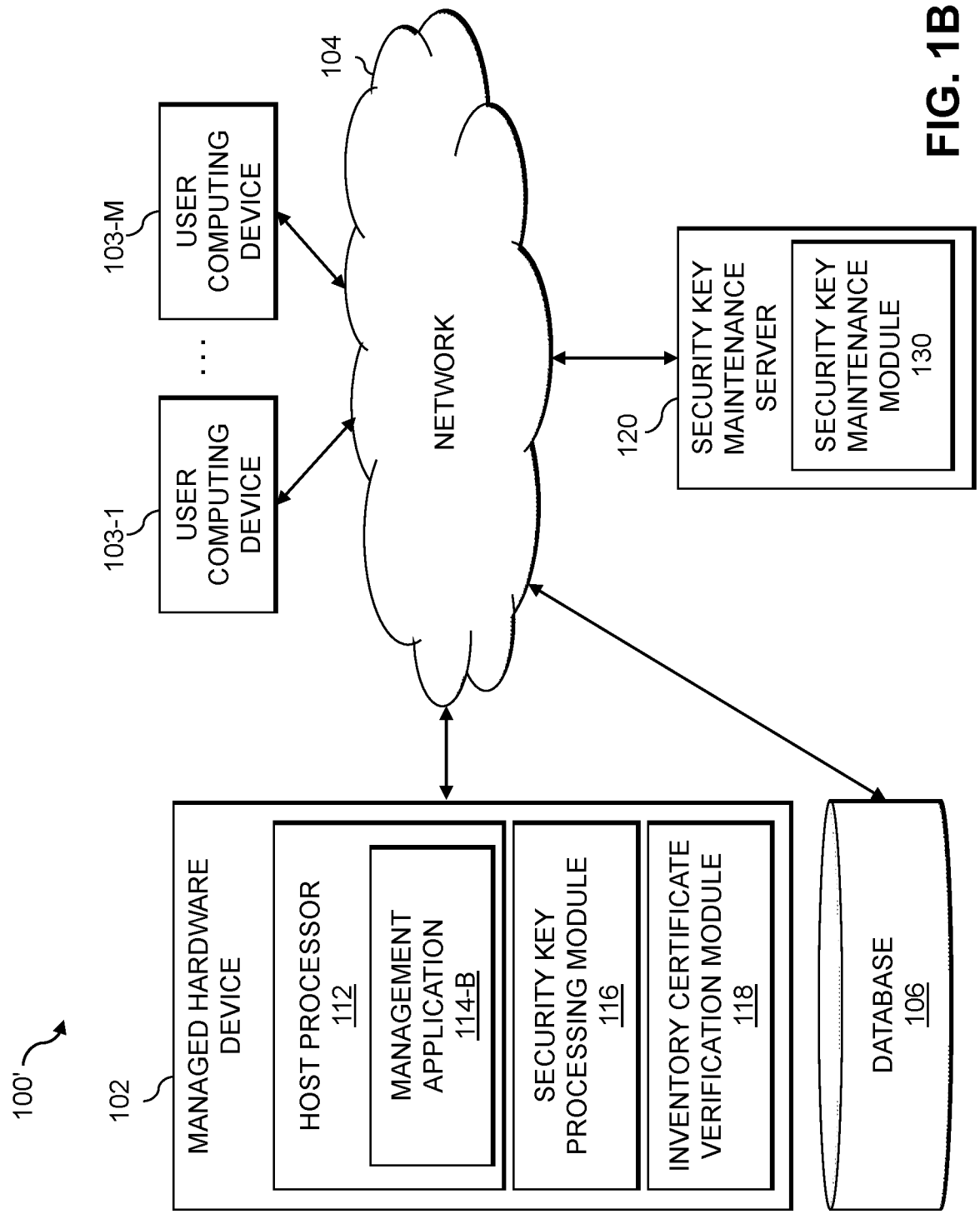

FIGS. 1A and 1B illustrate computer networks (also referred to herein as information processing systems) 100, 100' configured to protect devices using security key integrity verification in accordance with illustrative embodiments.

The computer network 100 comprises a plurality of user computing devices 103-1 through 103-M, collectively referred to herein as user computing devices 103. The user computing devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIGS. 1A and 1B embodiments. Also coupled to network 104 is one or more managed hardware devices 102, one or more databases 106, and one or more security key maintenance servers 120, discussed below.

The managed hardware devices 102 and/or user computing devices 103 may comprise, for example, host devices, storage appliances and/or devices such as mobile telephones, laptop computers, tablet computers, desktop computers or other types of computing devices. Such devices are examples of what are more generally referred to herein as "processing devices." Some of these processing devices are also generally referred to herein as "computers." The managed hardware devices 102 and/or user computing devices 103 may comprise a network client that includes networking capabilities such as ethernet, Wi-Fi, etc. When the managed hardware devices 102 and/or user computing devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user computing devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1A, an exemplary managed hardware device 102 may comprise a host processor 112, a management controller module 114-A, a security key processing module 116 and an inventory certificate verification module 118. In the example of FIG. 1A, the management controller module 114-A is assumed to be implemented as a dedicated baseboard management controller (BMC), such as the Integrated Dell Remote Access Controller (iDRAC), commercially available from Dell Technologies, or another out-of-band (OOB) controller, as discussed further below in conjunction with FIGS. 2, 4 and 5, for example. The security key processing module 116 may be employed to authenticate one or more users attempting to perform a privileged action using a security key, as discussed further below in conjunction with FIGS. 4 and 5, for example. The inventory certificate verification module 118 may be employed to validate a security key, using the disclosed security key integrity verification techniques, that is being used by one or more users attempting to perform a privileged action using a security key, as discussed further below in conjunction with FIGS. 4 and 5, for example.

In addition, the security key processing module 116 and/or the inventory certificate verification module 118 may request a multi-factor authentication of one or more users before a given action may be performed.

It is to be appreciated that this particular arrangement of elements 112, 114-A, 116, 118 illustrated in the managed hardware device 102 of the FIG. 1A embodiment is presented by way of example only, and alternative arrangements can be used in other embodiments. For example, the functionality associated with elements 112, 114-A, 116, 118 in other embodiments can be combined into a single element, or separated across a larger number of elements. As another example, multiple distinct processors can be used to implement different ones of elements 112, 114-A, 116, 118 or portions thereof.

At least portions of elements 112, 114-A, 116, 118 may be implemented at least in part in the form of software that is stored in memory and executed by a processor. An exemplary process utilizing elements 112, 114-A, 116, 118 of the managed hardware device 102 in computer network 100 will be described in more detail with reference to FIGS. 2, 4 and 5, for example.

In the example of FIG. 1B, a management application 114-B that executes on the host processor 112 is assumed to be implemented as a software application that executes the functions of a baseboard management controller, such as the iDRAC, referenced above. The other elements of FIG. 1B are assumed to be implemented in some embodiments in the same or a similar manner as the like-numbered elements of FIG. 1A and are not separately discussed herein.

The term "management controller," as used herein, is intended to be broadly construed to encompass a dedicated management controller, such as management controller module 114-A, or a management application, such as management application 114-B, as would be apparent to a person of ordinary skill in the art.

Other managed hardware devices 102 (not shown in FIGS. 1A and 1B) are assumed to be configured in a manner similar to that shown for managed hardware device 102 in the figure.

The security key maintenance server 120 may be implemented, for example, on the cloud, such as a private cloud, or on the premises of an enterprise or another entity. In some embodiments, the security key maintenance server 120, or portions thereof, may be implemented as part of a host device. As also depicted in FIGS. 1A and 1B, the security key maintenance server 120 further comprises a security key maintenance module 130. In some embodiments, the security key maintenance module 130 may provide security key certificates and other security key information, which may be recorded, for example, in one or more databases 106, discussed below.

It is to be appreciated that this particular arrangement of the security key maintenance module 130 illustrated in the security key maintenance server 120 of the FIGS. 1A and 1B embodiments is presented by way of example only, and alternative arrangements can be used in other embodiments. For example, the functionality associated with security key maintenance module 130 in other embodiments can include additional modules, or be separated across a larger number of modules. As another example, multiple distinct processors can be used to implement different portions of security key maintenance module 130.

At least portions of security key maintenance module 130 may be implemented at least in part in the form of software that is stored in memory and executed by a processor. An exemplary process utilizing security key maintenance module 130 of an example security key maintenance server 120 in computer network 100 will be described in more detail with reference to the flow diagram of, for example, FIG. 2.

Additionally, the managed hardware device 102, user computing devices 103 and/or the security key maintenance server 120 can have an associated database 106 configured to store, for example, information related to inventory certificates, information related to security keys and/or information related to various managed devices, such as one or more managed hardware devices 102, such as device locations, network address assignments and performance data.

At least portions of the database 106 configured to store, for example, inventory certificate, security key and/or device information may be implemented, for example, using a vault provided by an operating system of one or more of the managed hardware devices 102, user computing devices 103 and/or security key maintenance servers 120.

The database 106 in the present embodiment is implemented using one or more storage systems associated with the security key maintenance server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more managed hardware devices 102, user computing devices 103 and/or security key maintenance servers 120 may be implemented on a common processing platform, or on separate processing platforms. The managed hardware devices 102 and/or user computing devices 103 may be configured to interact over the network 104 in at least some embodiments with the security key maintenance server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more managed hardware devices 102, user computing devices 103 and/or security key maintenance servers 120 can be one or more input-output devices (not shown), which illustratively comprise keyboards, displays or other types of input-output devices in any combination. Such input-output devices can be used, for example, to support one or more user interfaces to the managed hardware devices 102 and/or the security key maintenance server 120, as well as to support communications between the managed hardware devices 102, security key maintenance server 120 and other related systems and devices not explicitly shown.

The one or more managed hardware devices 102, user computing devices 103 and/or security key maintenance servers 120 in the FIGS. 1A and 1B embodiments are assumed to be implemented using at least one processing device. Each such processing device generally comprises at least one processor and an associated memory, and implements one or more functional modules for controlling certain features of the respective device.

More particularly, the one or more managed hardware devices 102, user computing devices 103 and/or security key maintenance servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more managed hardware devices 102, user computing devices 103 and/or security key maintenance servers 120 to communicate in some embodiments over the network 104 with each other (as well as one or more other networked devices), and illustratively comprises one or more conventional transceivers.

It is to be understood that the particular set of elements shown in FIGS. 1A and 1B for security key integrity verification using inventory certificates is presented by way of illustrative example only, and in other embodiments additional or alternative elements may be used. Thus, another embodiment includes additional or alternative systems, devices and other network entities, as well as different arrangements of modules and other components.

FIG. 2 is a flow chart illustrating an exemplary implementation of a process 200 for provisioning security keys with a managed computing device in accordance with an illustrative embodiment. In the example of FIG. 2, an employee involved in the fabrication of a managed computing device builds the managed computing device and connects a security key in step 202.

In step 204, a management controller of the managed computing device authenticates the connected security key. For example, the management controller may ensure that a valid manufacturer manufactured the security key and that the security key has an accurate certificate.

In step 206, the management controller generates an inventory certificate for the managed computing device with a security key identifier and marks the security key in the inventory certificate as not being required for validation. In some embodiments, the security key identifier (e.g., a serial number, identity public key, unique hash value or another identifier) may be extracted from the connected security key and recorded in the inventory certificate. In step 208, the management controller adds the inventory certificate to an inventory certificate database, such as database 106. In step 210, an employee provides the managed computing device to a supply chain partner associated with the manufacturer of the managed computing device.

A customer deploys the managed computing device at a remote location in step 212 and the management controller of the managed computing device validates the security key and other components of the managed computing device at the remote location in step 214 using the inventory certificate (for example, the validation may comprise verifying that each component listed in the inventory certificate of the managed computing device is present in the managed computing device at the remote location and that the unique identifier associated with the managed computing device at the remote location matches the corresponding unique identifiers recorded in the inventory certificate). In some embodiments, the inventory validation techniques described in United States Patent Application Publication No. 2022/0207126, filed Dec. 30, 2020, entitled "Validating Secure Assembly and Delivery of Information Handling Systems," incorporated by reference herein in its entirety, may be employed.

In some embodiments, a lifecycle of the security key may be implemented and enforced using TCG delta certificates that restrict the performance of certain actions (e.g., binding and re-binding keys to managed computing devices) to a certain enterprise or entity. The disclosed techniques for security key integrity verification support a one key-to-one system model, a one key-to-many systems model, and/or a many keys-to-one system model, depending on the preferences of a given user.

FIG. 3 illustrates a managed computing device inventory certificate 300 in accordance with an illustrative embodiment. In the example of FIG. 3, the managed computing device inventory certificate 300 indicates a device identifier (e.g., a product serial number or other unique identifier) for a given managed computing device. The component class sequence of the managed computing device inventory certificate 300 can be used to identify the type of a component listed in the device inventory certificate 300, such as a security key. A component class registry object identifier (OID) allows the issuer of a component to convey which component class registry is used to identify the component. The component class value is a specific registry value for the listed component.

In addition, a compare unique identifier (UID) flag for a given component, such as a security key, may be set to true or false to indicate whether the given component is required to be present for a validation of the corresponding managed computing device to pass. The compare UID flag may be included in the optional platform properties field of a TCG platform certificate, for example.

Figure 4:
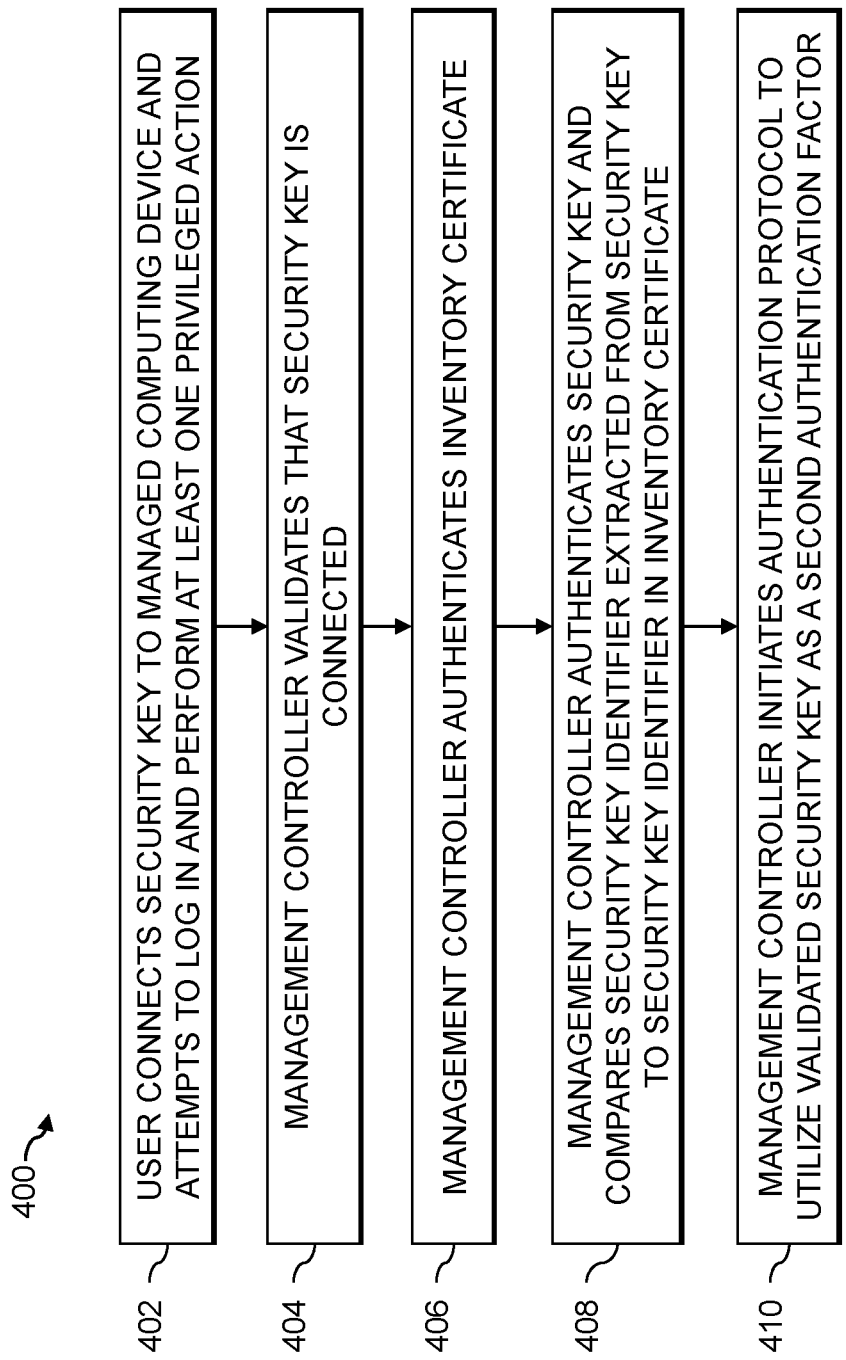
FIG. 4 is a flow chart illustrating an exemplary implementation of an authentication process for protecting devices using security key integrity verification in accordance with an illustrative embodiment.

FIG. 4 is a flow chart illustrating an exemplary implementation of an authentication process 400 for protecting devices using security key integrity verification in accordance with an illustrative embodiment. In the example of FIG. 4, a user connects a security key to a managed computing device in step 402 and attempts to log in and perform at least one privileged action (e.g., log in to a server, management interface or other product or to execute a privileged command, such as a data destruction operation). For a discussion of a processing of privileged commands, see, for example, U.S. patent application Ser. No. 17/958,844, filed Oct. 3, 2022, entitled "Device Protection Using Pre-Execution Command Interception and Evaluation," incorporated by reference herein in its entirety.

In step 404, the management controller of the managed computing device validates that the security key is connected to the managed computing device to verify the presence of a security key, for example, either locally to the managed computing device or remotely accessed via a network and a remote management interface. For example, a secured component verification discovery may determine if a security key is plugged into (or otherwise connected to) a given managed computing device.

In step 406, the management controller authenticates the inventory certificate (e.g., to verify that the in connection with has not been tampered with and is signed properly).

The management controller authenticates the security key during step 408 (e.g., by verifying that the security key is a genuine key having a valid unique identifier) and compares a security key identifier extracted from the security key to a security key identifier in the inventory certificate (and typically recorded in the inventory certificate during a provisioning of the security key with the managed computing device).

In step 410, the management controller initiates an authentication protocol (e.g., an authentication protocol normally performed for an authentication using a security key, as described above) to utilize the validated security key as a second authentication factor.

The management controller authorizes the performance of the requested at least one privileged action in response to successful authentications in steps 408 and 410. In this manner, in order for a user to authenticate before being authorized to perform a privileged action, the inventory certificate validation of the security key and other components of the managed computing device must pass, with the security key installed and attested to be a genuine security key as authorized by the entity that provisioned the managed computing device, as well as the original device authentication protocol supported by the security key.

Figure 5:
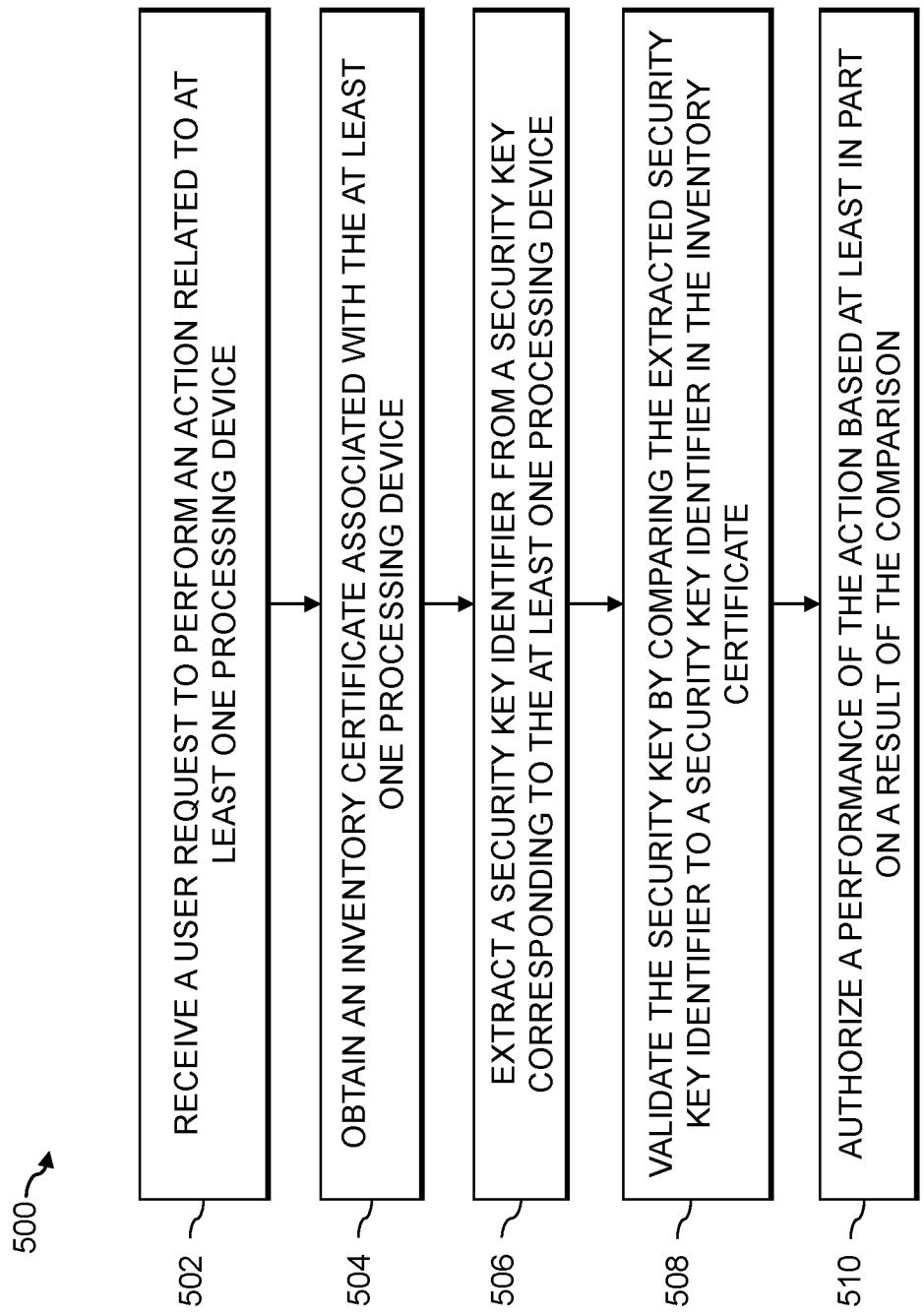
FIG. 5 is a flow chart illustrating an exemplary implementation of a process for security key integrity verification using inventory certificates in accordance with an illustrative embodiment.

FIG. 5 is a flow chart illustrating an exemplary implementation of a process 500 for security key integrity verification using inventory certificates in accordance with an illustrative embodiment. In the example of FIG. 5, step 502 receives a user request to perform at least one action related to at least one processing device comprising a processor coupled to a memory. In step 504, the process 500 obtains an inventory certificate associated with the at least one processing device.

A security key identifier is extracted from a security key corresponding to the at least one processing device in step 506. The security key is validated in step 508 by comparing the extracted security key identifier to a security key identifier in the inventory certificate. In step 510, a performance of the at least one action is authorized based at least in part on a result of the comparison.

In one or more embodiments, a validity of the inventory certificate associated with the at least one processing device is evaluated, for example, by evaluating a signature associated with the inventory certificate. The inventory certificate may be stored in a secure memory of the at least one processing device prior to a delivery of the at least one processing device to a purchaser of the at least one processing device. The security key may be authenticated by determining whether the security key satisfies one or more security key validity criteria.

A multi-factor authentication of the user may be performed utilizing the security key as a second authentication factor. A determination may be made as to whether the at least one action comprises an execution of a command of at least one designated type (e.g., a privileged command or operation). The comparison of the extracted security key identifier with the security key identifier in the inventory certificate may detect an anomaly with respect to the security key. The security key identifier of the security key may be recorded in the inventory certificate during a provisioning of the at least one processing device with an indication that the security key is not required to be connected to the at least one processing device for a validation of the at least one processing.

The particular processing operations and other network functionality described in conjunction with FIGS. 2, 4 and 5, for example, are presented by way of illustrative example only, and should not be construed as limiting the scope of the disclosure in any way. Alternative embodiments can use other types of processing operations for security key integrity verification using inventory certificates. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for security key integrity verification using inventory certificates can be employed, for example, to monitor for unauthorized privileged actions and to mitigate a detected unauthorized request to perform such a privileged action, for example, by automatically performing one or more actions to prevent a performance of a requested privileged action (e.g., the execution of an unauthorized command) and/or to mitigate an impact of the unauthorized privileged action.

One or more embodiments of the disclosure provide improved methods, apparatus and computer program products for security key integrity verification using inventory certificates. The foregoing applications and associated embodiments should be considered as illustrative only, and numerous other embodiments can be configured using the techniques disclosed herein, in a wide variety of different applications.

It should also be understood that the disclosed security key integrity verification techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for security key integrity verification using inventory certificates may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based security key integrity verification engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based security key integrity verification platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
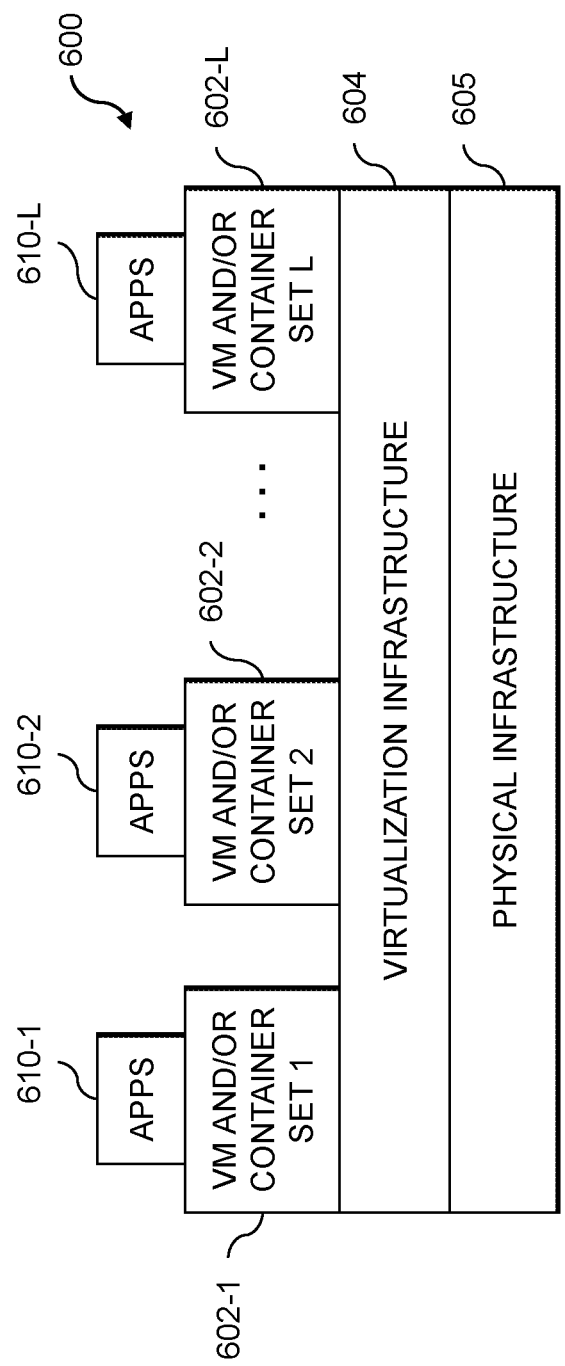
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide security key integrity verification functionality of the type described above for one or more processes running on a given one of the VMs. For example, each of the VMs can implement security key integrity verification control logic and associated inventory certificate evaluation functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide security key integrity verification functionality of the type described above for one or more processes running on different ones of the containers. For example, a container host device supporting multiple containers of one or more container sets can implement one or more instances of security key integrity verification control logic and associated inventory certificate evaluation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
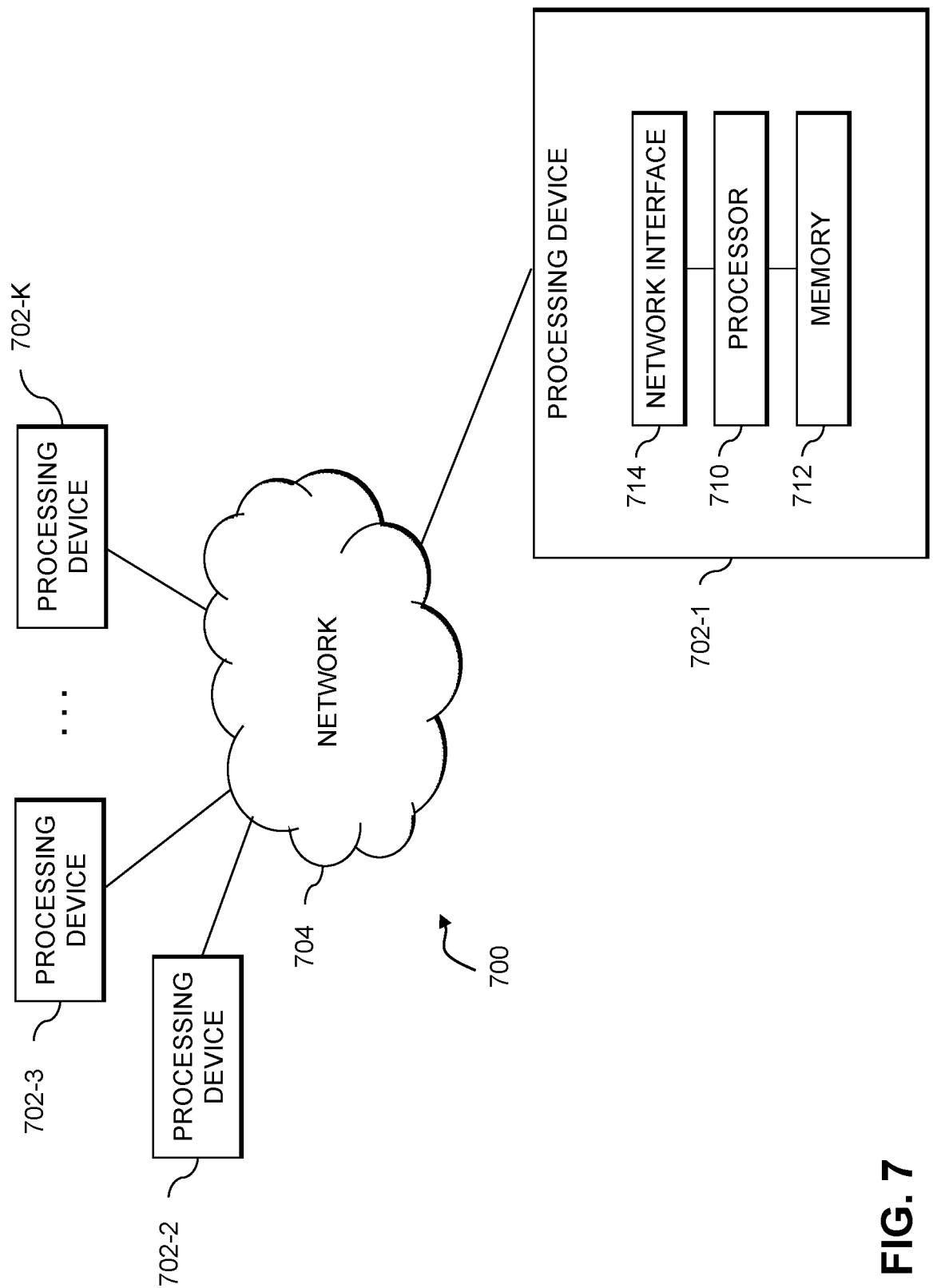
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines.

Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   receiving a user request to perform at least one action related to at least one processing device comprising a processor coupled to a memory;
   obtaining an inventory certificate associated with the at least one processing device, wherein the inventory certificate comprises a security key identifier of at least one security key of the at least one processing device, wherein the inventory certificate comprises a component class sequence that identifies a component type of the at least one security key and a comparison flag indicating whether the at least one security key needs to be present for a validation of the at least one processing device;
   extracting, based at least in part on a value of the comparison flag, a security key identifier from a security key corresponding to the at least one processing device;
   validating the security key by comparing the extracted security key identifier to the security key identifier in the inventory certificate; and
   authorizing a performance of the at least one action based at least in part on a result of the comparison;
   wherein the method is performed by the at least one processing device.

2. The method of claim 1, further comprising evaluating a validity of the inventory certificate associated with the at least one processing device.

3. The method of claim 2, wherein the evaluating the validity of the inventory certificate comprises evaluating a signature associated with the inventory certificate.

4. The method of claim 1, wherein the inventory certificate is stored in a secure memory of the at least one processing device prior to a delivery of the at least one processing device to a purchaser of the at least one processing device.

5. The method of claim 1, further comprising authenticating the security key by determining whether the security key satisfies one or more security key validity criteria.

6. The method of claim 1, further comprising performing a multi-factor authentication of a user utilizing the security key as a second authentication factor.

7. The method of claim 1, further comprising determining whether the at least one action comprises an execution of a command of at least one designated type.

8. The method of claim 1, wherein the comparison of the extracted security key identifier with the security key identifier in the inventory certificate detects an anomaly with respect to the security key.

9. The method of claim 1, further comprising determining whether the security key is connected to the at least one processing device.

10. The method of claim 1, further comprising recording the security key identifier of the security key in the inventory certificate during a provisioning of the at least one processing device with a property indicating that the security key is not required to be connected to the at least one processing device for a validation of the at least one processing device.

11. The method of claim 1, wherein the security key identifier of the at least one security key of the at least one processing device in the inventory certificate binds the at least one security key to the at least one processing device.

12. An apparatus comprising:
    at least one processing device comprising a processor coupled to a memory;
    the at least one processing device being configured to implement the following steps:
    receiving a user request to perform at least one action related to at least one processing device comprising a processor coupled to a memory;
    obtaining an inventory certificate associated with the at least one processing device, wherein the inventory certificate comprises a security key identifier of at least one security key of the at least one processing device, wherein the inventory certificate comprises a component class sequence that identifies a component type of the at least one security key and a comparison flag indicating whether the at least one security key needs to be present for a validation of the at least one processing device;
    extracting, based at least in part on a value of the comparison flag, a security key identifier from a security key corresponding to the at least one processing device;
    validating the security key by comparing the extracted security key identifier to the security key identifier in the inventory certificate; and
    authorizing a performance of the at least one action based at least in part on a result of the comparison.

13. The apparatus of claim 12, further comprising evaluating a validity of the inventory certificate associated with the at least one processing device.

14. The apparatus of claim 12, wherein the inventory certificate is stored in a secure memory of the at least one processing device prior to a delivery of the at least one processing device to a purchaser of the at least one processing device.

15. The apparatus of claim 12, further comprising authenticating the security key by determining whether the security key satisfies one or more security key validity criteria.

16. The apparatus of claim 12, further comprising performing a multi-factor authentication of a user utilizing the security key as a second authentication factor.

17. The apparatus of claim 12, further comprising recording the security key identifier of the security key in the inventory certificate during a provisioning of the at least one processing device with a property indicating that the security key is not required to be connected to the at least one processing device for a validation of the at least one processing device.

18. A non-transitory processor-readable storage medium having stored therein program code of one or more software programs, wherein the program code when executed by at least one processing device causes the at least one processing device to perform the following steps:

receiving a user request to perform at least one action related to at least one processing device comprising a processor coupled to a memory;

obtaining an inventory certificate associated with the at least one processing device, wherein the inventory certificate comprises a security key identifier of at least one security key of the at least one processing device, wherein the inventory certificate comprises a component class sequence that identifies a component type of the at least one security key and a comparison flag indicating whether the at least one security key needs to be present for a validation of the at least one processing device;

extracting, based at least in part on a value of the comparison flag, a security key identifier from a security key corresponding to the at least one processing device;

validating the security key by comparing the extracted security key identifier to the security key identifier in the inventory certificate; and authorizing a performance of the at least one action based at least in part on a result of the comparison.

19. The non-transitory processor-readable storage medium of claim 18, further comprising evaluating a validity of the inventory certificate associated with the at least one processing device.

20. The non-transitory processor-readable storage medium of claim 18, further comprising authenticating the security key by determining whether the security key satisfies one or more security key validity criteria.

* * * * *